United States Patent
Ruutu et al.

(10) Patent No.: US 7,346,345 B2
(45) Date of Patent: Mar. 18, 2008

(54) POSITIONING IN A TELECOMMUNICATIONS SYSTEM

(75) Inventors: Ville Ruutu, Espoo (FI); Jani Moilanen, Helsinki (FI); Maurizio Spirito, Turin (IT); Veli-Matti Teittinen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/500,632

(22) PCT Filed: Feb. 15, 2002

(86) PCT No.: PCT/IB02/01265

§ 371 (c)(1),
(2), (4) Date: Jul. 2, 2004

(87) PCT Pub. No.: WO03/069941

PCT Pub. Date: Aug. 21, 2003

(65) Prior Publication Data

US 2005/0064876 A1    Mar. 24, 2005

(51) Int. Cl.
H04Q 7/20    (2006.01)

(52) U.S. Cl. .......... 455/423; 455/404.2; 455/405; 455/432.1; 455/437; 455/440; 342/387; 342/464

(58) Field of Classification Search .......... 455/404.1, 455/437, 440; 342/387, 463, 464, 465, 456.1
See application file for complete search history.

(56) References Cited

U.S. PATENT DOCUMENTS

| | | | | |
|---|---|---|---|---|
| 4,665,404 A * | 5/1987 | Christy et al. | ............... | 342/463 |
| 4,799,062 A * | 1/1989 | Sanderford et al. | ......... | 342/450 |
| 5,008,679 A * | 4/1991 | Effland et al. | ............... | 342/353 |
| 6,018,312 A * | 1/2000 | Haworth | ..................... | 342/353 |
| 6,108,558 A | 8/2000 | Vanderpool, II | | |
| 6,128,501 A * | 10/2000 | Ffoulkes-Jones | ......... | 455/456.3 |
| 6,134,448 A * | 10/2000 | Shoji et al. | ............... | 455/456.2 |
| 6,230,018 B1 * | 5/2001 | Watters et al. | ........... | 455/456.3 |
| 6,275,705 B1 * | 8/2001 | Drane et al. | .............. | 455/456.2 |
| 6,313,790 B2 * | 11/2001 | Chang et al. | .......... | 342/357.16 |
| 6,445,927 B1 * | 9/2002 | King et al. | ............... | 455/456.6 |
| 6,493,539 B1 * | 12/2002 | Falco et al. | .............. | 455/67.11 |
| 6,611,788 B1 * | 8/2003 | Hussa | ........................ | 702/160 |
| 6,661,998 B1 * | 12/2003 | Hunzinger et al. | ........... | 455/68 |
| 6,785,553 B2 * | 8/2004 | Chang et al. | ............ | 455/456.5 |
| 2001/0034223 A1 * | 10/2001 | Rieser et al. | ............... | 455/404 |

(Continued)

FOREIGN PATENT DOCUMENTS

| DE | 197 21 504 C | 11/1998 |
|---|---|---|
| WO | WO 98/52376 | 11/1998 |
| WO | WO 99/53707 | 10/1999 |
| WO | WO 00/73813 | 12/2000 |
| WO | WO 01/84862 | 11/2001 |

*Primary Examiner*—Rafael Perez-Gutierrez
*Assistant Examiner*—Kwasi Karikari
(74) *Attorney, Agent, or Firm*—Squire, Sanders & Dempsey LLP

(57) ABSTRACT

A telecommunications system comprises a first transmitter unit situated at a first, known location; a second transmitter unit situated at a second, unknown location; a first receiving unit at a third, known location arranged to receive signals from the first and second transmitter units; and a second receiving unit at a fourth, known location arranged to receive signals from the first and second transmitter units, wherein the said signals received by the first and second receiving units are usable to ascertain the location of the second transmitter unit.

27 Claims, 3 Drawing Sheets

U.S. PATENT DOCUMENTS

2003/0052821 A1* 3/2003 Holt .......................... 342/453
2003/0125046 A1* 7/2003 Riley et al. ................. 455/456
2005/0024265 A1* 2/2005 Stilp et al. .................. 342/465
2005/0035897 A1* 2/2005 Perl et al. ..................... 342/29

* cited by examiner

POSITIONING IN A TELECOMMUNICATIONS SYSTEM

FIELD OF INVENTION

The present invention relates to a telecommunications system and a method of determining the location of a transmitter unit in the telecommunications system.

BACKGROUND OF INVENTION

The ability to pinpoint the location of mobile telephones is a desirable feature of a mobile telephone network. This is because of the need to provide customer services which rely on knowing the whereabouts of users of these services. For example, up-to-date local traffic information can be provided to enable a user to avoid nearby traffic jams. A user may also wish to know, for example, how to get to the nearest pub or restaurant from their present location. Clearly the location of the user must be ascertained to within even a few metres for this type of service to work.

Another reason for wishing to know the location of a mobile telephone is so that emergency services can locate a caller who is unable to provide an accurate personal location themselves.

The ability to pinpoint the location of a mobile telephone normally relies on ascertaining its position relative to known positions of mobile network entities such as base stations. It is known in the art and has been observed by the present inventors during mobile station location trials, that it can be very difficult to obtain accurate information about mobile telephone networks. Examples of problematic information include base station coordinates, base station identities and transmission channels used. This type of data is provided by the network operator and it is quite common for such data to be incorrect, for example because it has not been updated.

One specific problem is incorrect base station coordinates. If it is intended to pinpoint the location of a mobile telephone relative to a base station, it is clear that any location of the mobile telephone calculated on the basis of the base station coordinates will also be incorrect. The present inventors have noticed errors of up to several hundreds of meters in different countries in base station positions. Such large errors clearly have a negative impact when providing the type of customer services described above.

Another specific problem arises when base stations are identified wrongly. For example, in a GSM network a base station can be identified by its Broadcast Control Channel (BCCH) frequency and Base Station Identity Code (BSIC) value. This information is also provided by the network operator and if it is not correct, the wrong base station is identified, and its coordinates are used, which in turn means that the wrong coordinates are used for the calculation of mobile telephone location. Clearly, even with a relatively large number of base stations in a given network area, using the wrong coordinates could have a significant impact on the calculated mobile telephone position and hence the ability to advise the user of local information.

Yet another specific problem is that, depending on the particular operator, the transmission channels used might be changed relatively often. If non-updated channel information is used for mobile station location calculation, when frequencies have been changed, again, base stations are incorrectly identified.

It is also useful to know base station co-ordinates for the purposes of network planning to allow normal call and data operation. Even though the accuracy required for this is less than that required for the above-described location services, errors of several hundred meter can also cause problems in network planning.]

It would be desirable to provide a method of checking the consistency of network information such as the operator-provided information described above. Ideally such a method would be easily implementable in networks supporting E-OTD location method in GSM, and OTDOA-IPDL method in UMTS.

SUMMARY OF INVENTION

According to a first aspect of the present invention there is provided a telecommunications system comprising: a first transmitter unit situated at a first, known location; a second transmitter unit situated at a second, unknown location; a first receiving unit at a third, known location arranged to receive signals from the first and second transmitter units; and a second receiving unit at a fourth, known location arranged to receive signals from the first and second transmitter units, wherein the said signals received by the first and second receiving units are usable to ascertain the location of the second transmitter unit.

Preferably the signals are indicative of the time taken for the signals to arrive at the first and second receiving units from the first and second transmitters. The signals can be used to determine the time difference between the arrival times of signals at the first and second receiving units from the first and second transmitters.

Conveniently the first and/or second receiving units are moveable between a plurality of locations and are both arranged to receive a pair of signals when in each of the plurality of locations, the said pair of signals comprising a signal from the first transmitter unit and a signal from the second transmitter unit. In this case, a said pair of signals received by the first receiving unit and a said pair of signals received by the second receiving unit can be used together to calculate a range of possible locations of the second transmitter unit. The range of possible locations is usually in the form of a hyperbola in the X-Y plane in which the second transmitter unit is located, the said hyperbola running through substantially the location of the second transmitter unit.

In each of the plurality of locations the first and second receiving units receive pairs of signals which can differ from those pairs of signals received when the first and second receiving units are in others of the plurality of locations and the said different pairs of signals are together usable to calculate different ranges of possible locations of the second transmitter unit. In this case the different ranges of possible locations substantially coincide at a single common location that is substantially the location of the second transmitter unit. In any given location of the first and second receiving units, the pair of signals received by the first receiving Unit could be the same pair of signals that is received by the second receiving unit.

Alternatively, in any given location of the first and second receiving units, the pair of signals received by the first receiving unit could be a different pair of signals from the pair of signals received by the second receiving unit. For example, during one moment in time the first and second receivers could each measure a different pair of signals and at the next moment they could each measure the pair that the other measured earlier.

In either case, conveniently the plurality of locations is three locations.

It is possible for the signals received by the first and second receiving units to be received in response to signals sent to the first and second transmitter units by the first and second receiving units.

The said signals received by the first and second receiving units may further indicate their quality or accuracy.

The first and second receivers can be separate entities or the same entity. In the latter case, the said same receiver entity could be arranged to act as the said first receiver during a first period of time and as the said second receiver during a second separate period of time.

Conveniently, one or both of the first and second receivers is a mobile telephone. Advantageously, such a mobile telephone supports Enhanced Observed Time Difference (E-OTD) location method and Global Positioning System (GPS) location method, or Observed Time Difference Of Arrival (OTDOA) location method and Global Positioning System (GPS) location method.

Preferably, one or both of the first and second transmitter units is a cellular base station.

The first or second receivers could be location measurement units.

Usually, the second transmitter unit is in a fixed location.

Preferably the telecommunications system, further comprises a calculation unit arranged to use the signals received by the first and second receiving units or any values derived from the said signals to ascertain the location of the second transmitter unit. The calculation unit can be arranged to take account of the indication of quality or accuracy when using the signals received by the first and second receiving units.

If the telecommunications system is located within a telecommunications network, the calculation unit could be a network management unit or a Serving Mobile Location Centre.

The calculation unit can be arranged to verify the accuracy of the ascertained location of the second transmitter unit by comparing it with location information of the second transmitter unit obtained from other sources. The ascertained location of the second transmitter unit could also be used to check the accuracy of identification information of the second transmitter unit obtained form other sources and thus identify the second transmitter.

According to a second aspect of the invention, there is provided a telecommunications system comprising: a first transmitter unit situated at a first, known location; a second transmitter unit situated at a second, fixed, unknown location; a first receiving unit at a third, known location arranged to receive signals from the first and second transmitter units: and a second receiving unit at a fourth, known location arranged to receive signals from the first and second transmitter units, wherein the said signals received by the first and second receiving units are usable to ascertain the location of the second transmitter unit.

According to a third aspect of the invention, there is provided a telecommunications system comprising: a first base station situated at a first, known location; a second base station situated at a second, unknown location; a first mobile station at a third, known location arranged to receive signals from the first and second base stations; and a second mobile station at a fourth, known location arranged to receive signals from the first and second base stations, wherein the said signals received by the first and second mobile stations are usable to ascertain the location of the second base station.

According to a fourth aspect of the invention, there is provided a method of determining the location of a transmitter unit in a telecommunications system, the method comprising the steps of: receiving signals at a first receiving unit situated at a first, known location from a first transmitter unit situated at a second, known location and from a second transmitter unit situated at a third, unknown location; receiving signals at a second receiving unit situated at a fourth, known location from the said first transmitter unit and from the said second transmitter unit; and using the received signals to ascertain the location of the second transmitter unit.

According to a fifth aspect of the invention, there is provided a method of determining the location of a transmitter unit in a telecommunications system, the method comprising the steps of receiving signals at a first receiving unit situated at a first, known location from a first transmitter unit situated at a second, known location and from a second transmitter unit situated at a third, fixed, unknown location; receiving signals at a second receiving unit situated at a fourth, known location from the said first transmitter unit and from the said second transmitter unit; and using the received signals to ascertain the location of the second transmitter unit.

According to a sixth aspect of the invention, there is provided a method of determining the location of a base station in a telecommunications system, the method comprising the steps of: receiving signals at a first mobile station situated at a first, known location from a first base station situated at a second, known location and from a second base station situated at a third, unknown location; receiving signals at a second mobile station situated at a fourth, known location from the said first base station and from the said second base station; and using the received signals to ascertain the location of the second base station.

BRIEF DESCRIPTION OF DRAWINGS

Embodiments of the invention will now be described, by way of example only, with reference to the accompanying drawings in which.

In the figures like reference numerals indicate like parts and lower case letters are used to distinguish the same component when in different locations.

DESCRIPTION OF PREFERRED EMBODIMENTS

In embodiments of the invention a moving measurement unit collects information about the network to which it is connected and then uses this collected data to calculate any missing information about network entities. That information in turn can be used to pinpoint the location of mobile telephones or other entities which are using the network. One particular embodiment described below is directed towards calculating the position of a transmitter.

Figure 1:
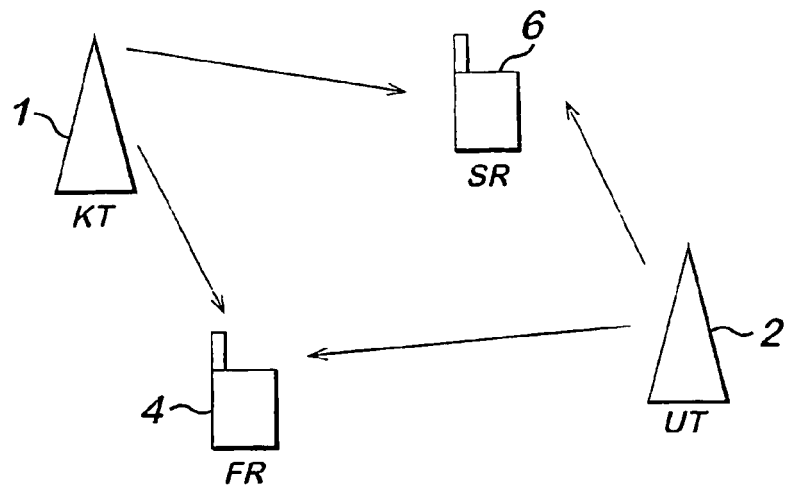
FIG. 1 shows in general terms a part of a mobile telephone network.

Referring firstly to FIG. 1, there are shown, in general terms, four entities of a mobile telephone network. The first of these is a known transmitter (KT) 1, which is at a known location within the network. It may be a base station or other transmitter. The second is an unknown transmitter (UT) 2, which is at an unknown location within the network. It is the location of UT 2 that the embodiment aims to pinpoint. The third entity is a first receiver (FR) 4 and the fourth is a second receiver (SR) 6. At least one of the FR 4 and the SR 6 is moveable within the network and their positions are always known.

In order to ascertain the location of the UT 2, the following procedure is carried out:

(i) The FR 4 performs an E-OTD (Estimated Observed Time Difference) measurement. This is hereinafter referred to as $OTD_{FR}$. The OTD is the observed time difference between a received signal from the KT 1 and a received signal from the UT 2, or in other words the elapsed time between the arrivals of signals from the two base stations at the first receiver.

In a GSM cellular system, the OTD is the time measured between the receptions of beginnings of bursts from the KT 1 and the UT 2 and it can be measured e.g. in nano or micro seconds or GSM bit period. Normal bursts, synchronisation bursts and dummy bursts are examples of the type of signal bursts that can be used. Since GSM uses periodic transmissions (one burst is 0.577 ms long), in practice the FR 4 can measure first the arrival of the signal from one of the KT 1 and the UT 2, and then the arrival of the signal from the other.

In either a GSM or a 3G system, the usual signals transmitted by the KT 1 and the UT 2 can be used for the OTD measurement. Alternatively it would be possible for the FR 4 to send out a signal to the KT 1 and the UT 2 and measure a signal received in response.

$$OTD_{FR}=RTD+GTD_{FR} \quad (1)$$

where RTD is the Real Time Difference between the KT 1 and the UT 2, i.e. actual time difference between the transmissions of the two signals from the KT 1 and the UT 2. This can alternatively be referred to as the actual transmission time difference. $GTD_{FR}$ is the Geometric Time Difference for the first receiver, which is the time difference between the propagation times of signals from the UT 2 and KT 1 to the FR 4, i.e. the time difference between the times taken for signals to travel the geometric distance from the transmitters KT 1 and UT 2 to the FR 4. Both RTD and GTD are suitably given in time units of nano or micro seconds.

Thus $GTD_{FR}$ is given by the equation:

$$GTD_{FR}=[d(FR,UT)-d(FR,KT)]/c \quad (2)$$

where d(FR,UT) is the distance between the FR 4 and the UT 2, d(FR,KT) is the distance between the FR 4 and the KT 1 and c is the speed of radio waves.

(ii) The SR 6 performs an E-OTD measurement in a similar manner, which is hereinafter referred to as $OTD_{SR}$.

$$OTD_{SR}=RTD+GTD_{SR} \quad (3)$$

where RTD is again the Real Time Difference between the KT 1 and the UT 2. Geometric Time Difference for the SR 6, $GTD_{SR}$ is given by the equation:

$$GTD_{SR}=[d(SR,UT)-d(SR,KT)]/c \quad (4)$$

where d(SR,UT) is the distance between the SR 6 and the UT 2, d(SR,KT) is the distance between the SR 6 and the KT 1 and c is the speed of radio waves.

(iii) The measurements are then used to solve RTD from (3) and (4), giving:

$$RTD=OTD_{SR}-GTD_{SR}=OTD_{SR}-[d(SR,UT)-d(SR,KT)]/c. \quad (5)$$

(iv) Inserting (5) and (2) into (1) gives $$OTD_{FR}=RTD+GTD_{FR}=OTD_{SR}-[d(SR,UT)-d(SR,KT)]/c+[d(FR,UT)-d(FR,KT)]/c. \quad (6)$$

(v) Rearranging (6) to transfer unknown variables to the left hand side, and multiplying the whole equation by c gives:

$$d(SR,UT)-d(FR,UT)=d(SR,KT)-d(FR,KT)+c*[OTD_{SR}-OTD_{FR}] \quad (7)$$

Thus the right hand side contains only known quantities because the OTD values are measured, and the coordinates of the KT 1 and the coordinates of both the FR 4 and the SR 6 are known. The left hand side of this equation defines a hyperbola, which is a contour in the XY-plane, whose every point has the property that the distance difference from it to the FR 4 and SR 6 is constant and equals the right hand side of the equation (7).

Figure 2:
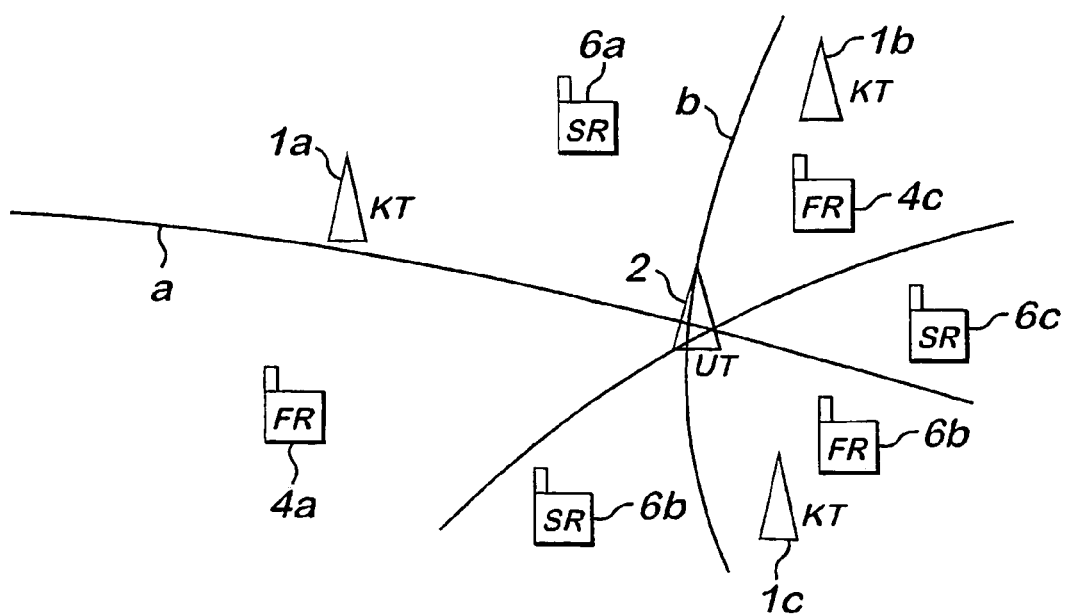
FIG. 2 shows the part of the network of FIG. 1 with some of the network entities in more than one location.

(vi) The measurement is repeated at least twice with at least one of the receivers FR 4 and SR 6 in a different position. This is illustrated in FIG. 2, which shows for this embodiment the FR 4 and the SR 6 in two locations additional to their locations of FIG. 1, the three locations being indicated by letters a, b and c. Thus three hyperbolas in total are obtained by the calculation method described above. The three hyperbolas are also shown in FIG. 2 and it can be seen that they correspond to the three sets of locations of the FR 4 and the SR 6. In this embodiment the three sets of measurements are taken using three different known transmitters KT 1, however a single known transmitter could be used.

(vii) The three hyperbolas cross at substantially a single location, the point of substantial coincidence providing an estimate for the location of the UT 2. This point is obtained using normal hyperbolic equation solving techniques (in a similar manner to those used when working directly with the E-OTD location method for mobile handsets).

It should be noted that the SR 6 could alternatively remain in the same position for all three sets of measurements, whilst only the FR 4 moves.

A further point to note is that, for each set of measurements, both OTD values (i.e. measured by FR 4 and SR 6) should be measured within a short time window, otherwise RTD drifts need to be compensated for in order to achieve an acceptable level of accuracy. The length of the time window depends on how large the RTD drift is. For example, in a GSM network according to the standards, RTD drift should be between −0.1 and 0.1 ppm. If the exact drift is not known and compensated for, in the worst case RTD drift generates ~30 m error per second.

In contrast to mobile station location, the position of the UT 2 can be assumed to be fixed. This means that it is possible to collect many measurements (and consequently calculate many hyperbolas). In order to achieve optimum accuracy, tens or more hyperbolas would be used in practice. On the other hand poor quality measurements could worsen accuracy if a sufficient number of good quality hyperbolas have already been obtained. Thus in addition to the data described above, although not essential, measurement quality figures could be attached to each OTD measurement and used to determine a weight (or quality figure) for each hyperbola. Thus when the hyperbolic equations are finally solved to produce a location estimate for the UT 2, the hyperbolas should be weighted using these weights.

Once a location of the UT 2 has been ascertained, the calculated location can be compared to existing information in the database provided by the network operator to see whether there are any discrepancies. As well as simply comparing the database and calculated coordinates, the calculated location can be used to check other information such as base station identity and transmission channel.

Firstly the calculated location is compared with the location coordinates provided in the database. If the two values differ by more than a certain acceptable threshold (for example 500 m) then it can be concluded that either the location information in the database is wrong or that the identification information of the UT 2 is wrong and consequently that measurements have been taken for a different transmitter other than that intended. This can be illustrated with the following example:

Let us suppose that the database says that a GSM BTS with Cell Identity (CI) of 100 has a BCCH frequency of 10 and a BSIC of 4. The database further says that the BTS is located at x=1000, y=1000. By contrast the calculated location gives x=2000, y=2000 for the measured BTS. There are two possibilities. The first possibility is that the real location of the BTS with a CI=100 is x=2000, y=2000 and the database has incorrect location coordinates. The second possibility is that the BTS with a BCCH frequency of 10 and a BSIC of 4 is actually the BTS with CI=101 and this BTS is incorrectly identified in the database as CI=100. In this case, the database could be checked to see whether there is also a BTS with CI=101 at x=2000, y=2000 and if so, the measured BTS is simply incorrectly identified in the database. Thus the embodiment can be used to check the accuracy and consistency of various database information.

Once the correct information has been ascertained, it can subsequently be used to monitor the position of mobile telephones and the like using the network. Furthermore, the data could be used to dynamically update a Network Management System (NMS).

It will be understood that the measured signals are sent to a network management unit which also performs the above-detailed calculations.

When implemented in GSM, a mobile station (MS) would be told by the serving BTS to take measurements for certain neighboring base stations for handover purposes. The MS can identify the base stations by their BCCH frequency and BSIC value and can be told to measure base stations having certain values of BCCH frequency. The first and second receivers could both be provided with the same list of base stations for which to take measurements, which in practice would be the same list as is provided for handover.

Some examples of implementation of the embodiment are as follows:

1. One Mobile Telephone and One or More Location Measurement Units (LMUs)

Figure 3:
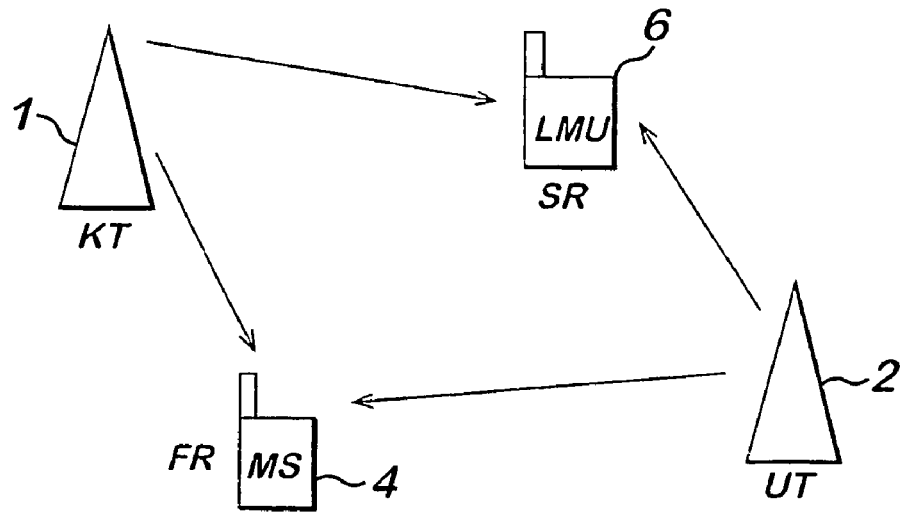
FIG. 3 shows the part of the network of FIG. 1 with the network entities more specifically identified, in accordance with a first example of the invention.

This example is illustrated in FIG. 3. The one or more LMUs act as the SR 6 and a mobile telephone acts as the FR 4. The KT 1 and the UT 2 are both base stations. Different hyperbolas are obtained by moving the mobile telephone to different locations, whilst the LMU stays in one position.

2. Two Mobile Telephones

Figure 4:
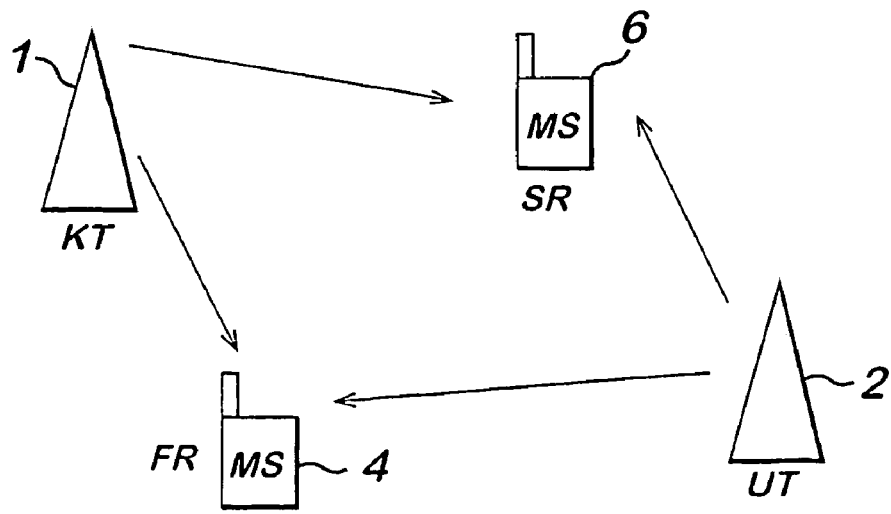
FIG. 4 shows the part of the network of FIG. 1 with the network entities more specifically identified, in accordance with a second example of the invention.

This example is illustrated in FIG. 4. One of the mobile telephones acts as the FR 4 and the other as the SR 6. The KT 1 and the UT 2 are both base stations. Both mobile telephones are moved to different locations in order to obtain different hyperbolas. One requirement is that the real position of the mobile telephones is known (e.g by GPS). Another requirement is that both mobile telephones should be able to receive simultaneously signals from the KT 1 and the UT 2.

3. One Mobile Telephone

Figure 5:
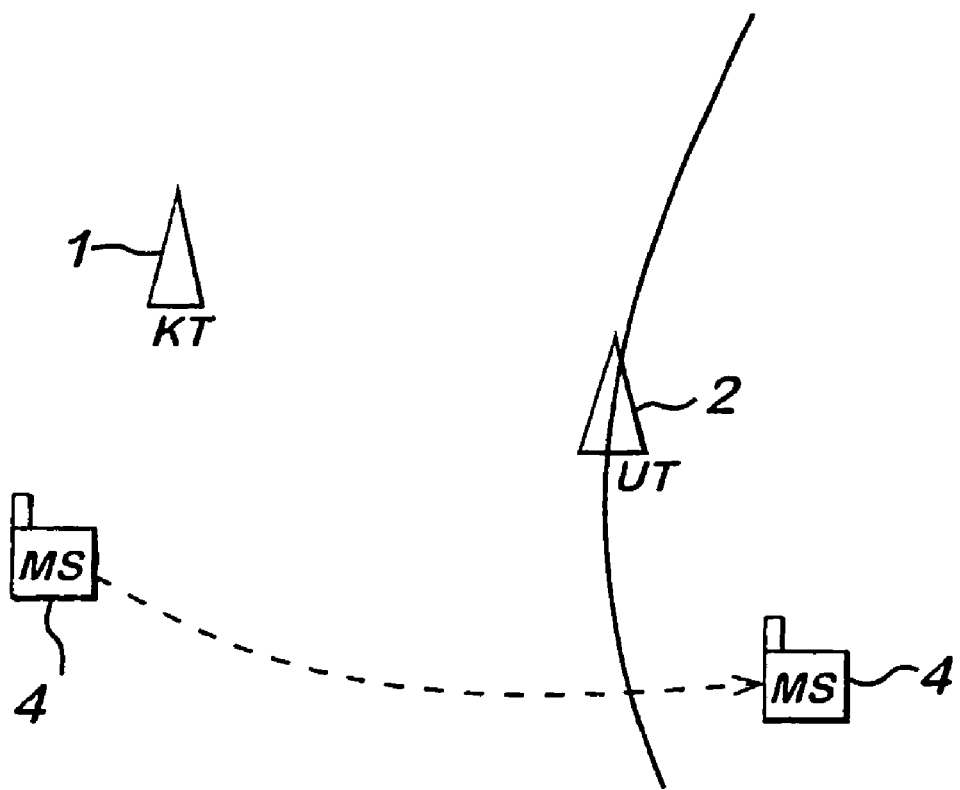
FIG. 5 shows the part of the network of FIG. 1 with the network entities more specifically identified, in accordance with a third example of the invention.

This example is illustrated in FIG. 5. In this case the mobile station acts as the first and the second receiver. In one position the OTD measurement is used as a measurement from the first receiver, and once the mobile has moved sufficiently, another measurement is used as a measurement from the second receiver. It should be noted that this example works effectively only if the RTD drift between the base stations is slow.

Thus the embodiment allows the accuracy and consistency of network information to be monitored and checked.

It can be understood by those skilled in the art that the invention is easy to implement because routinely provided equipment is used. In its simplest form, only a single, moveable receiver having E-OTD functionality and provided with a GPS is required. The calculations can be performed by any suitable network management unit, such as a Serving Mobile Location Center (SMLC). Thus a network operator could use subscribers having mobile telephones equipped with E-OTD/GPS to automatically monitor the network. Another possibility is just to do test measurements with an E-OTD phone and separate GPS equipment.

It can also be appreciated that the method of the invention could be used to locate a moving mobile telephone using the same calculation principles. However, one particularly useful implementation is the ability to locate accurately a base station during installation of a location system without the need to physically visit the base station. This could provide a useful saving in labour costs.

The above-described embodiment can be easily implemented in networks supporting E-OTD location method in GSM (2G), or OTDOA-IPDL method in UMTS (3G).

The invention claimed is:

1. A telecommunications system comprising:
 a first base station unit situated at a first, known location;
 a second base station unit situated at a second, unknown location;
 a mobile station configured to receive signals at a third, known location from the first and second base stations; and, once the mobile station has moved, to receive signals at a fourth known location from the first and second base stations, wherein the said signals received at the third and fourth locations are usable to ascertain the location of the second base station.

2. The telecommunications system according to claim 1, wherein the signals are indicative of the time taken for the signals to arrive at the third and fourth locations from the first and second base stations.

3. The telecommunications system according to claim 2, wherein the said signals are further indicative of their quality or accuracy.

4. The telecommunications system according to claim 1, wherein the mobile station is moved between a plurality of locations including said third and fourth locations and is arranged to receive a pair of signals when in each of the plurality of locations, the said pair of signals comprising a signal from the first base station and a signal from the second base station.

5. The telecommunications system according to claim 4, wherein two of said pairs of signals received by the mobile station are together useable to calculate a range of possible locations of the second base station.

6. The telecommunications system according to claim 5, wherein the range of possible locations is in the form of a hyperbola in the X-Y plane in which the second base station is located, the said hyperbola running through substantially the location of the second base station.

7. The telecommunications system according to claim 5, wherein in each of the plurality of locations the mobile station receives pairs of signals which differ from those pairs of signals received when the mobile station is in others of the plurality of locations and the said different pairs of signals are together usable to calculate different ranges of possible locations of the second base station.

8. The telecommunications system according to claim 7, wherein the different ranges of possible locations substantially coincide at a single common location that is substantially the location of the second base station.

9. The telecommunications system according to claim 4, wherein, in any given location of the mobile station, the pair of signals received by the mobile station is the same pair of signals that is received by the mobile station at another location.

10. The telecommunications system according to claim 4, wherein in any given location of the mobile station, the pair of signals received by the mobile station is a different pair of signals from the pair of signals received by the mobile station at another location.

11. The telecommunications system according to claim 4, wherein the plurality of locations is three locations.

12. The telecommunications system according to claim 1, wherein the signals received by the mobile station are received in response to signals sent to the first and second base stations by the mobile station.

13. The telecommunications system according to claim 1, wherein the mobile station is arranged to act as a first receiver during a first period of time and as a second receiver during a second separate period of time.

14. The telecommunications system according to claim 1, wherein the mobile station is a mobile telephone.

15. The telecommunications system according to claim 14, wherein the said mobile telephone supports Enhanced Observed Time Difference (EOTD) location method and Global Positioning System (GPS) location method, or Observed Time Difference Of Arrival (OTDOA) location method and Global Positioning System (GPS) location method.

16. The telecommunications system according to claim 1, wherein the first and second base stations are cellular base stations.

17. The telecommunications system according to claim 1, wherein the second base station is in a fixed location.

18. The telecommunications system according to claim 1, further comprising a calculation unit arranged to use the signals received by the mobile station or any values derived from the said signals to ascertain the location of the second base station.

19. The telecommunications system according to claim 18, wherein the calculation unit is arranged to take account of the indication of quality or accuracy when using the signals received by the mobile station.

20. The telecommunications system according to claim 18, located within a telecommunications network, wherein the calculation unit is a network management unit.

21. The telecommunications system according to claim 18, located within a telecommunications network, wherein the calculation unit is a serving mobile location centre.

22. A telecommunications system comprising:
a first base station situated at a first, known location;
a second base station situated at a second, unknown location;
a mobile station configured to receive signals at a third, known location from the first and second base station; and, once the mobile station has moved, to receive signals at a fourth known location from the first and second base stations, wherein the signals received at the third and fourth locations are usable to ascertain the location of the second base station; and,
a calculation unit configured to use the signals received at the third and fourth locations or any values derived from the signals to ascertain the location of the second base station; and,
wherein the calculation unit is configured to verify the accuracy of the ascertained location of the second base station by comparing it with location information of the second base station obtained from other sources.

23. A telecommunications systems comprising:
a first base station situated at a first, known location;
a second base station situated at a second, unknown location; and
a mobile station configured to receive signals at a third, known location from the first and second base station; and, once the mobile station has moved, to receive signals at a fourth known location from the first and second base stations, wherein the said signals received at the third and fourth locations are usable to ascertain the location of the second base station; and
wherein the ascertained location of the second base station is usable to check the accuracy of identification information of the second base station obtained from other sources and thus identify the second base station.

24. A method of determining the location of a base station in a telecommunications system, the method comprising:
receiving signals at a mobile station situated at a first, known location from a first base station situated at a second, known location and from a second base station situated at a third, unknown location, and determining the time difference between the arrival times of a signal from the first base station and a signal from the second base station;
receiving signals at the mobile station situated at a fourth, known location from the first base station and from the second base station and determining the time difference between the arrival times of a signal from the first base station and a signal from the second base station; and
using the time differences determined, to ascertain the location of the second base station.

25. A method of determining the location of a base station in a telecommunications system, the method comprising:
receiving signals at a mobile station situated at a first, known location from a first base station situated at a second, known location and from a second base station situated at a third, fixed, unknown location and determining the time difference between the arrival times of a signal from the first base station and a signal from the second base station;
receiving signals at the mobile station situated at a fourth, known location from the said first base station and from the said second base station and determining the time difference between the arrival times of a signal from the first base station and a signal from the second base station; and
using the time differences determined to ascertain the location of the second base station.

26. A calculation unit for use in a telecommunications systems, comprising:
- a first base station situated at a first, known location;
- a second base station situated at a second, unknown location; and
- a mobile station configured to receive signals at a third known location from the first and second base stations; and further configured to determine the time difference between the arrival times of a signal from the first base station and a signal from the second base station;
- wherein, once the mobile station has moved, it is configured to receive signals at a fourth, known location from the first and second base stations, and further configured to determine the time difference between the arrival time of a signal from the first base station and a signal from the second base station;
- wherein the calculation unit is configured to use the time differences between the arrival times of signals from the first and second base stations as determined at the third and fourth locations to ascertain the location of the second base station.

27. A computer readable medium encoded with a computer program for use in a telecommunications system, wherein the telecommunication system includes

- a first base station situated at a first, known location;
- a second base station situated at a second, unknown location; and
- a mobile station-arranged to receive signals at a third, known location from the first and second base stations; and further arranged to determine the time difference between the arrival times of a signal from the first base station and a signal from the second base station;
- wherein the mobile station is arranged to receive signals at a fourth, known location from the first and second base stations, and further arranged to determine the time difference between the arrival time of a signal from the first base station and a signal from the second base station;
- the computer program is configured to use the time differences between the arrival times of signals from the first and second base stations as determined at the third and fourth locations to ascertain the location of the second base station.

* * * * *